United States Patent
Oshiumi et al.

(10) Patent No.: US 12,435,224 B2
(45) Date of Patent: Oct. 7, 2025

(54) CROSSLINKABLE POLYMER COMPOSITION, CROSSLINKED POLYMER MATERIAL, METAL MEMBER, AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, NATIONAL UNIVERSITY CORPORATION, Fukuoka (JP)

(72) Inventors: Naoyuki Oshiumi, Yokkaichi (JP); Takehiro Hosokawa, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 252 days.

(21) Appl. No.: 18/033,856

(22) PCT Filed: Oct. 28, 2021

(86) PCT No.: PCT/JP2021/039800
§ 371 (c)(1),
(2) Date: Apr. 26, 2023

(87) PCT Pub. No.: WO2022/102423
PCT Pub. Date: May 19, 2022

(65) Prior Publication Data
US 2023/0399525 A1   Dec. 14, 2023

(30) Foreign Application Priority Data

Nov. 16, 2020   (JP) .................. 2020-189983

(51) Int. Cl.
*C09D 5/08* (2006.01)
*C08K 5/098* (2006.01)
(Continued)

(52) U.S. Cl.
CPC ........... *C09D 5/086* (2013.01); *C09D 133/08* (2013.01); *C09D 147/00* (2013.01);
(Continued)

(58) Field of Classification Search
None
See application file for complete search history.

(56) References Cited

U.S. PATENT DOCUMENTS

| 2002/0022700 A1 | 2/2002 | Chino et al. |
| 2004/0010090 A1 | 1/2004 | Chino et al. |

(Continued)

FOREIGN PATENT DOCUMENTS

| JP | H05-106045 A | 4/1993 |
| JP | H05-239292 A | 9/1993 |

(Continued)

OTHER PUBLICATIONS

Sengoku—JP 2000-212359 A—PCT D2—MT—vinyl chloride resin—2000 (Year: 2000).*
(Continued)

*Primary Examiner* — John Vincent Lawler
(74) *Attorney, Agent, or Firm* — Oliff PLC

(57) ABSTRACT

A crosslinkable polymer composition and a crosslinked polymer material including a metal member and a wiring harness. The crosslinkable polymer composition contains component A from which metal ion is released by heat,
(Continued)

component B containing an organic polymer having a substituent capable of ionic bonding with the metal ion released from component A, and component C containing one or more acidic phosphate ester with a carbon number of 4 to 30. Assuming that the metal ion released from component A has a valence of +y and a content of the metal ion is m mol, the substituent contained in component B has a valence of −z and a content of the substituent is n mol, the acidic phosphate constituting component C has a valence of −x and a content of the acidic phosphate esters is 1 mol $g \geq 0.1$ holds for $g=(m \cdot y - l \cdot x)/(n \cdot z)$.

9 Claims, 3 Drawing Sheets

(51) Int. Cl.

| | | |
|---|---|---|
| C08K 5/521 | (2006.01) | |
| C09D 133/08 | (2006.01) | |
| C09D 147/00 | (2006.01) | |
| C09D 183/04 | (2006.01) | |
| H01B 7/00 | (2006.01) | |
| H01B 7/28 | (2006.01) | |
| H01B 7/29 | (2006.01) | |

(52) U.S. Cl.
CPC ......... *C09D 183/04* (2013.01); *H01B 7/2806* (2013.01); *H01B 7/292* (2013.01); *C08K 5/098* (2013.01); *C08K 5/521* (2013.01); *H01B 7/0045* (2013.01)

(56) References Cited

U.S. PATENT DOCUMENTS

| | | | |
|---|---|---|---|
| 2004/0029990 A1 | 2/2004 | Fujita et al. | |
| 2008/0254216 A1 | 10/2008 | Kadota et al. | |
| 2009/0087667 A1* | 4/2009 | Tomizaki | C09D 5/024 |
| | | | 428/413 |
| 2010/0256027 A1 | 10/2010 | Miyamoto et al. | |
| 2014/0378612 A1* | 12/2014 | Dinkar | C08K 3/36 |
| | | | 524/860 |
| 2015/0291834 A1 | 10/2015 | Isotani et al. | |
| 2017/0062954 A1 | 3/2017 | Hase et al. | |
| 2017/0190876 A1* | 7/2017 | Kagumba | C08K 5/5333 |
| 2017/0243673 A1* | 8/2017 | Nakashima | C09J 133/14 |
| 2017/0313918 A1 | 11/2017 | Kasahara et al. | |
| 2019/0106652 A1 | 4/2019 | Takata et al. | |
| 2019/0143730 A1 | 5/2019 | Kuse et al. | |
| 2020/0332100 A1 | 10/2020 | Ashihara et al. | |
| 2020/0392350 A1* | 12/2020 | Oshiumi | C23F 11/1676 |
| 2022/0242981 A1 | 8/2022 | Aoki et al. | |
| 2023/0265263 A1 | 8/2023 | Oshiumi et al. | |

FOREIGN PATENT DOCUMENTS

| | | | |
|---|---|---|---|
| JP | H07-041636 A | 2/1995 | |
| JP | H11-235872 A | 8/1999 | |
| JP | H11-314672 A | 11/1999 | |
| JP | 2000-178456 A | 6/2000 | |
| JP | 2000212359 A * | 8/2000 | ............ C08J 5/00 |
| JP | 2001-342305 A | 12/2001 | |
| JP | 2002-20579 A | 1/2002 | |
| JP | 2002-317122 A | 10/2002 | |
| JP | 2004-35822 A | 2/2004 | |
| JP | 2004-51814 A | 2/2004 | |
| JP | 2005-054087 A | 3/2005 | |
| JP | 3958201 B2 | 8/2007 | |
| JP | 2008-163239 A | 7/2008 | |
| JP | 2009-82781 A | 4/2009 | |
| JP | 2010-92782 A | 4/2010 | |
| JP | 2010-096416 A | 4/2010 | |
| JP | 2011-162673 A | 8/2011 | |
| JP | 2015-509995 A | 4/2015 | |
| JP | 2015-086281 A | 5/2015 | |
| JP | 2015-106141 A | 6/2015 | |
| JP | 2015-151614 A | 8/2015 | |
| JP | 2016-050288 A | 4/2016 | |
| JP | 2016-98333 A | 5/2016 | |
| JP | 2017-179040 A | 10/2017 | |
| JP | 2018-080327 A | 5/2018 | |
| JP | 2019-157209 A | 9/2019 | |
| JP | 2020-033429 A | 3/2020 | |
| JP | 2020-161398 A | 10/2020 | |
| JP | 2020-164837 A | 10/2020 | |
| JP | 2020-176257 A | 10/2020 | |
| JP | 2021-8613 A | 1/2021 | |
| JP | 2021-155600 A | 10/2021 | |
| WO | 2005/087697 A1 | 9/2005 | |
| WO | 2007/052522 A1 | 5/2007 | |
| WO | 2014/057858 A1 | 4/2014 | |
| WO | 2016/067891 A1 | 5/2016 | |
| WO | 2017/117499 A1 | 7/2017 | |
| WO | 2017/204046 A1 | 11/2017 | |
| WO | WO-2019189723 A1 * | 10/2019 | ............ C08K 3/013 |

OTHER PUBLICATIONS

Natori—WO 2019-189723 A1—PCT D5—MT—sealing comp—2019 (Year: 2019).*
Jan. 28, 2025 Office Action issued in Japanese Patent Application No. 2023-545549.
Apr. 4, 2024 Office Action issued in Chinese Patent Application No. 202180082057.9.
May 18, 2021 Search Report issued in International Patent Application No. PCT/JP2021/012501.
Dec. 9, 2021 International Preliminary Report on Patentability issued in International Patent Application No. PCT/JP2021/012501.
Oct. 17, 2023 Office Action issued in Japanese Patent Application No. 2020-058326.
Feb. 22, 2022 International Search Report issued in International Patent Application No. PCT/JP2021/044193.
Brahma, S. et al. "Zinc acetylacetonate hydrate adducted with nitrogen donor ligands: Synthesis, spectroscopic characterization, and thermal analysis". Journal of Molecular Structure, 1101 (2015) 41-49.
Purkayastha, D.D. et al. "Surfactant controlled low-temperature thermal decomposition route to zinc oxide nanorods from zinc(II) acetylacetonate monohydrate". Journal of Luminescence, 154 (2014) 36-40.
Oct. 18, 2022 Search Report issued in International Patent Application No. PCT/JP2022/032375.
U.S. Appl. No. 18/682,344, filed Feb. 8, 2024 in the name of Sato et al.
U.S. Appl. No. 17/914,182, filed Sep. 23, 2022 in the name of Oshiumi et al.
Dec. 21, 2021 Search Report issued in International Patent Application No. PCT/JP2021/039800.
U.S. Appl. No. 18/038,141, filed May 22, 2023 in the name of Oshiumi et al.
Oct. 18, 2022 Search Report issued in International Patent Application No. PCT/JP2022/032374.
U.S. Appl. No. 18/682,368, filed Feb. 8, 2024 in the name of Sato et al.
Jan. 28, 2025 Office Action issued in Japanese Patent Application No. 2023-545548.
Jul. 2, 2024 Office Action Issued in Japanese Patent Application No. 2022-568223.
Jun. 4, 2025 Notice of Allowance issued in U.S. Appl. No. 17/914,182.
Jun. 25, 2025 Office Action issued in U.S. Appl. No. 18/038,141.
PubChem—Bis(acetylacetonato)titanium oxide—accessed Jun. 16, 2025 (Year: 2025).

* cited by examiner

CROSSLINKABLE POLYMER COMPOSITION, CROSSLINKED POLYMER MATERIAL, METAL MEMBER, AND WIRING HARNESS

TECHNICAL FIELD

The present disclosure relates to a crosslinkable polymeric composition, a crosslinked polymer material, a metal member, and a wiring harnesses.

BACKGROUND ART

Grease may be used in metal equipment and metal components to prevent corrosion. For example, PTL1 describes use of grease, which contains perfluoroether base oil, thickening agent, barium sulfate, or antimony oxide, for mechanical parts.

Methods of adding an anticorrosion property to metal equipment or a metal component include protecting a surface with any of various curable materials. Various curing types of curable materials are known, including photocurable, moisture-curable, anaerobic-curable, cationic-curable, anionic-curable, and thermosetting materials. For example, PTL2 describes use of an epoxy curing material as a thermosetting material.

CITATION LIST

Patent Literature

PTL1: International Publication WO 2007/052522.
PTL2: JP 2016-098333 A.
PTL3: JP 2015-151614 A.
PTL4: JP 2017-179040 A.

SUMMARY OF INVENTION

Technical Problem

When grease is used for anticorrosion of a metal surface, it is difficult to achieve both heat resistance and simple formation of a coating film. Grease includes a base oil in which a thickening agent is dispersed, and is extremely reduced in viscosity when being heated. Hence, when grease is applied to a metal surface, although the grease is easily applied by heating, if heat is applied to a coating film, outflow of the grease occurs, and thus a grease coating film tends to be low in heat resistance. Selecting a thickening agent allow the grease to be less likely to flow out even under a high temperature condition. In such a case, however, heating temperature required to apply the grease to the metal surface is also higher, making it difficult to form a uniform coating film.

On the other hand, when a metal surface is protected using any of various curable materials, it is difficult to achieve both simple formation of a coating film and a uniform coating film. A moisture-curable material, a cationic-curable material, an anionic-curable material, or a thermosetting material usually takes a long time to cure, which makes it less easy to form a coating film. An anaerobic curable material requires oxygen blocking during curing, which also makes it less easy to form a coating film. A photocurable material has a relatively high curing rate, which however slowly cures in an area that is less exposed to light, making it difficult to form a highly uniform coating film.

The problem to be solved by the present disclosure is to provide a crosslinkable polymer composition and a crosslinked polymer material that each have high corrosion resistance and high heat resistance and allow a highly uniform coating film to be effectively formed, and provide a metal member and a wiring harness, to each of which the crosslinkable polymer composition and the crosslinked polymer material are applied.

Solution to Problem

A crosslinkable polymer composition according to the disclosure includes:
component A from which metal ion is released by heat,
component B comprising an organic polymer having a substituent capable of ionic bonding with the metal ion released from component A, and
component C comprising one or more acidic phosphate ester comprising one or more species represented by general formulas (C1) and (C2) below,

  (C1)

  (C2)

wherein, assuming that the metal ion released from component A has a valence of +y and a content of the metal ion is m mol, the substituent contained in component B has a valence of −z and a content of the substituent is n mol, the acidic phosphate constituting component C has a valence of −x and a content of the acidic phosphate esters is l mol, $g \geq 0.1$ holds for $g=(m \cdot y - l \cdot x)/(n \cdot z)$.

where R is a hydrocarbon group with a carbon number of 4 to 30.

A crosslinked polymer material according to the disclosure is a crosslinked product of the crosslinkable polymer composition of the disclosure, in which component B is crosslinked via the metal ion released from component A.

A metal member according to the disclosure includes a metal base and a coating material that covers a surface of the metal base, in which the coating material contains the crosslinked polymer material of the disclosure.

A wiring harness according to the disclosure includes the crosslinked polymer material of the disclosure.

Advantageous Effects of Invention

According to the crosslinkable polymer composition of the disclosure, it is possible to effectively form a highly uniform coating film having high corrosion resistance and high heat resistance.

DESCRIPTION OF EMBODIMENTS

Description of Embodiments of Present Disclosure

Figure 1:
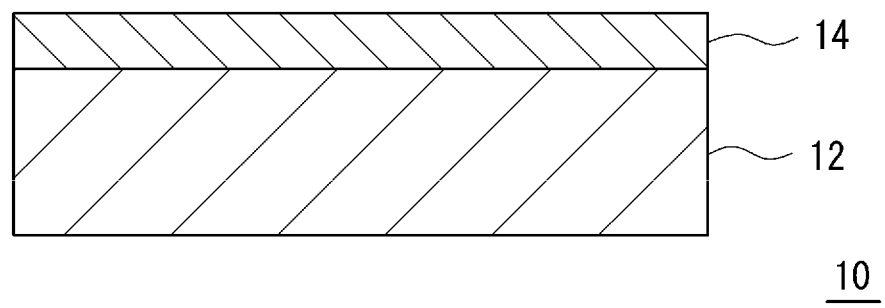
FIG. 1 is a cross section of a metal member according to one embodiment of the disclosure.

Aspects of the disclosure are now listed and described.
(1) A crosslinkable polymer composition according to the disclosure includes:
component A from which metal ion is released by heat;
component B comprising an organic polymer having a substituent capable of ionic bonding with the metal ion released from component A; and component C comprising one or more acidic phosphate ester comprising one or more species represented by general formulas (C1) and (C2) below,

$$P(=O)(-OR)(-OH)_2 \quad (C1)$$

$$P(=O)(-OR)_2(-OH) \quad (C2)$$

wherein, assuming that the metal ion released from component A has a valence of +y and a content of the metal ion is m mol, the substituent contained in component B has a valence of −z and a content of the substituent is n mol, the acidic phosphate constituting component C has a valence of −x and a content of the acidic phosphate esters is l mol, $$g \geq 0.1 \text{ holds for } g=(m \cdot y - l \cdot x)/(n \cdot z).$$

where R is a hydrocarbon group with a carbon number of 4 to 30.

In the crosslinkable polymer composition of the disclosure, component B is crosslinked by heating via the metal ion released from component A. As a result, a coating film having high heat resistance can be formed through heating. In addition, component C forms a phosphate ester salt with the metal ion released from component A to form a metal-adsorbing component, so that the crosslinkable polymer composition exhibits a high anticorrosion property. On the other hand, when being not heated, the crosslinkable polymer composition of the disclosure is highly fluid and thus can be highly uniformly applied to a metal surface or the like. After that, a coating film excellent in anticorrosion property and heat resistance is formed only by heating as described above, so that a highly uniform coating film can be effectively formed. Furthermore, since g≥0.1 holds true, a sufficient amount of metal ion to promote crosslinking of component B are released from component A, so that curing by crosslinking proceeds in a short time and a coating film excellent in both anticorrosion performance and heat resistance can be formed.

(2) Component A preferably has a decomposition temperature or a phase transition point at 50° C. or higher and 200° C. or lower. This is because, during preparation of or before use of the crosslinkable polymer composition, the metal ion is less likely to be released from component A, and the crosslinkable polymer composition is less likely to be cured, and thus the crosslinkable polymer composition is excellent in applicability at a low temperature such as room temperature and is excellent in storage stability, for example, less likely to be changed in quality during storage of the crosslinkable polymer composition, at the low temperature. In addition, the metal ion is sufficiently released from component A due to decomposition or phase transition of component A at an appropriate temperature, and thus curing rate is high in use of the crosslinkable polymer composition.

(3) Component A is preferably a metal complex. This is because the metal ion is effectively stabilized by a ligand, release of the metal ion from component A is suppressed during preparation of or before use of the crosslinkable polymer composition, and the metal ion is likely to be released from component A by heat in use of the crosslinkable polymer composition.

(4) Component A is preferably a metal complex containing a multidentate ligand or a bridging ligand. This is because coordination by a multidentate ligand or a bridging ligand is more effective in stabilizing metal ion by a ligand than non-crosslinked coordination by a monodentate ligand, so that release of the metal ion from component A is more suppressed during preparation of or before use of the crosslinkable polymer composition.

(5) Component A is preferably a metal complex containing β-diketonato ligand or an alkoxide ligand. The β-diketonato ligand and the alkoxide ligand coordinate stably to metal ion. This is because the β-diketonato and alkoxide ligands are likely to form multidentate or bridging coordination, in which case they are each more effective in stabilizing the metal ion by the ligand than the non-cross-linked coordination caused by the monodentate ligand, resulting in more suppression of release of the metal ion from component A during preparation of or before use of the crosslinkable polymer composition.

(6) Metal ion released from component A is preferably ion of at least one metal selected from the group consisting of alkaline earth metals, zinc, titanium, and aluminum. This is because ions of those metals have a valence of two or more, leading to higher stability of a crosslinked polymer material comprising a crosslinked product of the crosslinkable polymer composition. In addition, when such metal ion forms a phosphate ester salt with component C, the phosphate ester salt exhibits high adsorptivity to a metal surface.

(7) The substituent of component B is preferably an electron-withdrawing group. This is because such an electron-withdrawing group effectively forms an ionic bond with the metal ion released from component A.

(8) The substituent of component B is preferably at least one selected from the group consisting of a carboxylic acid group, an acid anhydride group, a phosphoric acid group, and a sulfonic acid group. This is because such a group effectively forms an ionic bond with the metal ion released from component A.

(9) Component B is preferably liquid at 150° C. or lower. This is because the crosslinkable polymer composition can be applied to a metal surface or the like at a relatively low temperature.

(10) Component A is preferably contained in the composition in an amount of 1 part by mass or larger and 30 parts by mass or smaller with respect to 100 parts by mass of component B. This is because such content provides excellent crosslinking performance of the crosslinkable polymer composition and facilitates avoidance of influence of a large amount of component A contained, such as separation or precipitation of component A.

(11) Component C is preferably contained in the composition in an amount of 1 part by mass or larger and 30 parts by mass or smaller with respect to 100 parts by mass of component B. This is because such content provides a high anticorrosion property of the crosslinkable polymer composition, and facilitates avoidance of influence of a large amount of component C contained, such as separation or precipitation of component C.

(12) A crosslinked polymer material of the disclosure is a crosslinked product of the crosslinkable polymer composition of the disclosure, in which component B is crosslinked via the metal ion released from component A. The crosslinked polymer material therefore has high anticorrosion property and high heat resistance, and can be effectively formed as a highly uniform coating film.

(13) A metal member of the disclosure includes a metal base and a coating material covering a surface of the metal base, where the coating material contains the crosslinked polymer material of the disclosure. As a result, the metal member has an excellent anticorrosion property, and maintains such a high anticorrosion property even if heated.

(14) A wiring harness of the disclosure includes the crosslinked polymer material of the disclosure. As a result, the wiring harness has an excellent anticorrosion property, and maintains such a high anticorrosion property even if heated.

Details of Embodiments of Present Disclosure

Specific examples of the crosslinkable polymer composition, the crosslinked polymer material, the metal member, and the wiring harness of the disclosure are now described with reference to the drawings. The disclosure should not be limited to those examples.

[1] Crosslinkable Polymer Composition and Crosslinked Polymer Material

The crosslinkable polymer composition of the disclosure includes component A from which metal ion is released by heat, component B comprising the organic polymer having the substituent capable of ionic bonding with the metal ion released from component A, and component C comprising the acidic phosphate ester having a predetermined structure. The crosslinkable polymer composition of the disclosure is heated so that component B is crosslinked via the metal ion released from component A, and is thus cured and forms the crosslinked polymer material according to an embodiment of the disclosure. Component C forms a phosphate ester salt with the metal ion released from component A and serves as a metal-adsorbing component.

(1) Component A

Component A is a component from which metal ion is released by heat. The expression "by heat" is given assuming heating at a temperature higher than room temperature. Release of metal ion means that the metal ion is released from component A through decomposition or phase transition of component A. The metal ion released from component A causes crosslinking of component B and formation of a metal salt with component C.

Component A preferably has a decomposition temperature or a phase transition temperature at 50° C. or higher and 200° C. or lower. This is because the metal ion is less likely to be released from component A and the crosslinkable polymer composition is less likely to be cured during preparation of or before use of the crosslinkable polymer composition (before heating), and thus the crosslinkable polymer composition is easily applied at a low temperature such as room temperature, and the crosslinkable polymer composition has excellent storage stability, i.e., quality change of the crosslinkable polymer composition is suppressed during storage thereof at a low temperature such as room temperature. In addition, component A decomposes or undergoes phase transition at an appropriate temperature, so that the metal ion is sufficiently released from component A, resulting in high curing rate in use of the crosslinkable polymer composition. From the above viewpoint, component A preferably has a decomposition temperature or a phase transition temperature at 60° C. or higher, more preferably 70° C. or higher. In addition, from the above viewpoint, component A preferably has the decomposition temperature or the phase transition temperature at 150° C. or lower, more preferably 120° C. or lower. The decomposition temperature or the phase transition temperature of component A is expressed as a temperature at which the baseline change starts in differential scanning calorimetry (DSC) (measurement temperature range: 25° C. to 200° C., measurement in air). The above phase transition point does not include a melting point, and the above phase transition does not include melting.

Examples of the metal ion released from component A include ion of at least one metal selected from the group consisting of alkaline earth metals, zinc, titanium, aluminum, iron, nickel, copper, and zirconium. The metal ion is preferably ion of at least one of these metals. The metal ion may include ion of only one or two or more of the metals. The metal ion is preferably ion of at least one metal selected from the group consisting of alkaline earth metals, zinc, titanium, and aluminum. This is because the metal ion of each of such metals has a valence of two or more, sufficiently crosslinks organic polymers, and provides excellent stability of a crosslinked polymer material containing a crosslinked product of the crosslinkable polymer composition. Among the above preferred metal species, zinc is particularly preferred. This is because zinc provides particularly excellent stability of the crosslinked polymer material containing the crosslinked product of the crosslinkable polymer composition. The alkaline earth metals, zinc, titanium, and aluminum listed above as preferable are each a metal with a valence of two or more and have a relatively high ionization tendency, and thus can form a phosphate ester salt, which exhibits a high adsorptivity to a metal surface, with component C.

Examples of component A include metal complexes. The metal complex includes a coordination bond of a ligand having non-covalent electron pairs to a central metal ion. Component A is preferably the metal complex. This is because a high effect of stabilizing the metal ion by a ligand is exhibited, release of the metal ion from component A is suppressed during preparation of or before use of the crosslinkable polymer composition, and the metal ion is sufficiently released by heat from component A in use of the crosslinkable polymer composition.

The ligand of the metal complex has a group having a lone electron pair, and the group forms a coordinate bond with the metal ion to form the metal complex. The ligand includes a monodentate ligand having one coordination site and a multidentate ligand having two or more coordination sites. Due to a chelate effect, a metal complex formed by the multidentate ligand is more stable than a metal complex formed by the monodentate ligand. The ligand includes a non-bridging ligand, in which one ligand coordinates to one metal ion, and a bridging ligand, in which one ligand coordinates to two or more metal ions. The bridging ligand may include a monodentate ligand or a multidentate ligand.

Component A is preferably the metal complex containing the multidentate ligand or the bridging ligand. This is because coordination by the multidentate ligand or the bridging ligand is more effective in stabilizing the metal ion by a ligand than non-bridging type coordination by the monodentate ligand, causing release of the metal ion from component A to be more suppressed during preparation of or before use of the crosslinkable polymer composition.

Examples of the ligand of the metal complex include a β-diketonato ligand (1,3-diketonato ligand) and an alkoxide ligand. The β-diketonato ligand is represented by the following general formula (1). The alkoxide ligand is represented by the following general formula (2). Examples of the β-diketonato ligand includes: an acetylacetonato ligand (acac); a 2,2,6,6-tetramethyl-3,5-heptanedionato ligand (dpm); a 3-methyl-2,4-pentadionato ligand; a 3-ethyl-2,4-pentanedionato ligand; a 3,5-heptanedionato ligand; a 2,6-dimethyl-3,5-heptanedionato ligand; and a 1,3-diphenyl-1, 3-propanedionato ligand. Examples of the alkoxide ligand include a methoxide ligand, an ethoxide ligand, an isopropoxide ligand, a n-propoxide ligand, and an n-butoxide ligand.

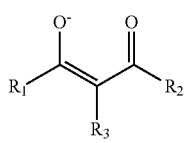
(1)

In the chemical formula (1), $R_1$, $R_2$ and $R_3$ each represent a hydrocarbon group. $R_1$, $R_2$ and $R_3$ may be hydrocarbon groups with the same structure or of a different structure from each other. $R_1$, $R_2$ and $R_3$ may each be an aliphatic hydrocarbon group or a hydrocarbon group containing an aromatic ring. $R_1$, $R_2$ and $R_3$ are each preferably a hydrocarbon group with 1 to 10 carbon atoms. $R_3$ may be hydrogen atom. A case where at least two of the hydrocarbon groups $R_1$, $R_2$ and $R_3$ are interconnected by a ring structure is also included.

$$R_4-O^-  \quad (2)$$

In the chemical formula (2), $R_4$ represents a hydrocarbon group. $R_4$ may be an aliphatic hydrocarbon group or a hydrocarbon group containing an aromatic ring. $R_4$ is preferably a hydrocarbon group with 1 to 10 carbon atoms.

Component A is preferably a metal complex containing the β-diketonato ligand or the alkoxide ligand. The reason for this is as follows. That is, the D-diketonato ligand and the alkoxide ligand each coordinate stably to the metal ion. In addition, the D-diketonato ligand and the alkoxide ligand each tend to form a multidentate or bridging coordination, which provides a more excellent effect of stabilizing the metal ion by a ligand than a non-bridging coordination by a monodentate ligand, and more suppressing release of the metal ion from component A during preparation of or before use of the crosslinkable polymer composition.

(2) Component B

Component B contains an organic polymer having a substituent capable of ionic bonding with the metal ion released from component A. Examples of the substituent capable of ionic bonding with the metal ion include a carboxylic acid group, an acid anhydride group, a phosphoric acid group, and a sulfonic acid group. The substituent contains no hydroxyl groups. The substituent may be only one of or at least two of the above-listed substituents. The substituent is preferably at least one of the above-listed substituents. This is because such a substituent effectively forms an ionic bond with the metal ion released from component A. The substituent is preferably an electron-withdrawing group. This is because the electron-withdrawing group effectively forms the ionic bond with the metal ion released from component A.

While being not limited, the content of the substituent in component B is preferably 0.01% by mass or larger and 10% by mass or smaller from the viewpoint of ensuring physical properties by crosslinking. The content is more preferably 0.1% by mass or larger and 5% by mass or smaller, and further preferably 0.2% by mass or larger and 3% by mass or smaller. The content of the substituent in component B can be determined by comparing peak height specific to the substituent in the infrared spectrum with a spectral peak height of a material with a known content.

The organic polymer of component B is an organic polymer including resin, rubber, and elastomer. Component B may be liquid or solid at room temperature, but is preferably liquid at 150° C. or lower. This is because the crosslinkable polymer composition can be applied thereby to a metal surface or the like at a relatively low temperature. Furthermore, component B is preferably liquid at room temperature. This is because the crosslinkable polymer composition can be applied thereby to a metal surface or the like at room temperature. Furthermore, this makes it easy to prepare the crosslinkable polymer composition. Not only component B alone, but also the crosslinkable polymer composition as a whole is preferably liquid at a temperature below 150° C., and even at room temperature. Furthermore, component B preferably has a molecular weight of 1000 or more. This is because such component B is effectively cured by crosslinking even if it is liquid at room temperature. On the other hand, component B preferably has a molecular weight of 100,000 or less from the viewpoint that such component B tends to be liquid at room temperature. More preferably, component B has the molecular weight of 50,000 or less. The molecular weight of component B is represented by number average molecular weight (Mn) by Gel Permeation Chromatography (GPC) analysis.

Examples of the organic polymer of component B include polyolefin, polybutadiene, polyisoprene, polyacrylate, polymethacrylate, polyurethane, polyester, and organopolysiloxane (silicone). The substituent of component B may be a substituent introduced into either the main chain or the side chain of the organic polymer. The organic polymer of component B particularly preferably includes polybutadiene and polyisoprene from the viewpoint of securing fluidity at room temperature. Herein, the term "organic polymer" includes polymers with a relatively low degree of polymerization, such as oligomers.

(3) Component C

Component C contains one or more acidic phosphate ester containing one or more species represented by the following general formulas (C1) and (C2).

$$P(=O)(-OR)(-OH)_2 \quad (C1)$$

$$P(=O)(-OR)_2(-OH) \quad (C2)$$

where R is a hydrocarbon group with 4 to 30 carbon atoms.

Component C is heated and forms a metal salt with the metal ion released from component A. The metal salt becomes a metal-adsorbing component that is adsorbed to a metal surface or the like. The metal-adsorbing component exhibits anticorrosion performance that protects the metal surface from corrosion.

By using a hydrocarbon group with a carbon number 4 to 30 as the hydrocarbon group R constituting the acidic phosphate ester containing one or more species represented by the formulas (C1) and (C2), component C exhibits high compatibility with component B, so that component C is less likely to aggregate in the crosslinkable polymer composition and exhibits high dispersibility. Even after forming the salt with the metal ion released from component A by heat, component C is dispersed in component B cured by ion crosslinking and maintains metal adsorptivity. The number of carbon atoms in the hydrocarbon group is more preferably 5 or more, further preferably 6 or more from the viewpoint of enhancing dispersibility. The number of carbon atoms is more preferably 26 or less, and further preferably 22 or less. Examples of the hydrocarbon group R include alkyl, cycloalkyl, alkyl-substituted cycloalkyl, alkenyl, aryl, alkyl-substituted aryl, and arylalkyl groups.

Examples of the alkyl group include butyl, pentyl, hexyl, heptyl, octyl, nonyl, decyl, undecyl, dodecyl, tridecyl, tetradecyl, pentadecyl, hexadecyl, heptadecyl, and octadecyl groups. These alkyl groups may be linear or branched.

Examples of the cycloalkyl group include cyclopentyl, cyclohexyl, and cycloheptyl groups. Examples of the alkyl-substituted cycloalkyl group include methylcyclopentyl, dimethylcyclopentyl, methylethylcyclopentyl, diethylcyclopentyl, methylcyclohexyl, dimethylcyclohexyl, methylethylcyclohexyl, diethylcyclohexyl, methylcycloheptyl dimethylcycloheptyl, methylethylcycloheptyl, and diethylcycloheptyl groups. The substitution position of the alkyl-substituted cycloalkyl group is not limited. The alkyl group may be linear or branched.

Examples of the alkenyl group include butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, and octadecenyl groups. These alkenyl groups may be linear or branched.

Examples of the aryl group include a phenyl group and a naphthyl group. Examples of the alkyl-substituted aryl group include tolyl, xylyl, ethylphenyl, propylphenyl, butylphenyl, pentylphenyl, hexylphenyl, heptylphenyl, octylphenyl, nonylphenyl, decylphenyl, undecylphenyl, and dodecylphenyl. The substitution position of the alkyl-substituted aryl group is not limited. The alkyl group may be linear or branched. Examples of the arylalkyl group include benzyl, phenylethyl, phenylpropyl, phenylbutyl, phenylpentyl, and phenylhexyl groups. The alkyl group may be linear or branched.

From the viewpoint of enhancing dispersibility in component B, the hydrocarbon group is preferably an aliphatic hydrocarbon group or an alicyclic hydrocarbon group. More preferably, the hydrocarbon group is the aliphatic hydrocarbon group. Examples of the aliphatic hydrocarbon group include an alkyl group including saturated hydrocarbon and an alkenyl group including unsaturated hydrocarbon. The alkyl group or the alkenyl group, which is an aliphatic hydrocarbon group, may have either a linear or branched structure. However, if the alkyl group is a linear alkyl group, such as a n-butyl group or a n-octyl group, such alkyl groups tend to be oriented towards each other, leading to a reduction in dispersibility in component B. From this point of view, when the hydrocarbon group is the alkyl group, a branched alkyl group is more preferable than a linear alkyl group. On the other hand, the alkenyl group has one or more carbon-carbon double bond structures, and thus exhibits not so high orientation even if it is linear. Hence, the alkenyl group may be either linear or branched.

Examples of the specific acid phosphate esters include butyloctyl acid phosphate, isomyristyl acid phosphate, isocetyl acid phosphate, hexyldecyl acid phosphate, isostearyl acid phosphate, isobehenyl acid phosphate, octyldecyl acid phosphate, octyldodecyl acid phosphate, isobutyl acid phosphate, 2-ethylhexyl acid phosphate, isodecyl acidphosphate, lauryl acidphosphate, tridecyl acid phosphate, stearyl acid phosphate, oleyl acid phosphate, myristyl acid phosphate, palmityl acid phosphate, di-butyloctyl acid phosphate, di-isomyristyl acid phosphate, di-isocetyl acid phosphate, di-hexyldecyl acid phosphate, di-isostearyl acid phosphate, di-isobehenyl acid phosphate, di-octyldecyl acid phosphate, di-octyldodecyl acid phosphate, di-isobutyl acid phosphate, di-2-ethylhexyl acid phosphate, di-isodecyl acid phosphate, di-tridecyl acid phosphate, di-oleyl acid phosphate, di-myristyl acid phosphate, and di-palmityl acid phosphate. Among these compounds, stearyl acid phosphate, oleyl acid phosphate, and di-2-ethylhexyl acid phosphate are preferred in terms of high anticorrosion performance when formed into metal salts and dispersibility in component B.

The crosslinkable polymer composition of the disclosure may appropriately contain additives such as a diluent, a dispersant, and a colorant in addition to the components A to C to the extent that material functions are not hindered. However, the crosslinkable polymer composition preferably contains no grease component and no curable material, such as a light-curable material, a moisture-curable material, an anaerobic-curable material, a cationic-curable material, an anionic-curable material, and a thermosetting material. In the crosslinkable polymer composition of the disclosure, when component B is liquid at 150° C. or lower or at room temperature, a polymer component that is solid at 150° C. or lower or at room temperature should not be contained. More preferably, the crosslinkable polymer composition contains only component B as the polymer component. In addition, the following compounds of groups (a) to (f) can be listed as components that should not be contained in the crosslinkable polymer composition. Specifically, (a) silane coupling agents, (b) epoxy compounds, (c) isocyanate and isothiocyanate compounds, (d) photo-radical generators and thermal radical generators, (e) chlorine compounds and bromine compounds, and (f) volatile organic solvents can be listed. If any of the compounds of the groups (a) to (d) is contained in the crosslinkable polymer composition, an unintended chemical reaction may occur during heating, for example, crosslinking of component B by a reaction different from the crosslinking reaction mediated by the metal ion released from component A, or cleavage of the main chain of component B. As a result, heat resistance and re-moldability of the crosslinkable polymer composition may not be exhibited sufficiently. If any of the compounds of the group (e) is contained in the crosslinkable polymer composition, coloring or generation of corrosive gas may occur. If any of the compounds of the group (f) is contained in the crosslinkable polymer composition, ignition or generation of air bubbles may occur during molding of the composition.

The crosslinkable polymer composition can be easily prepared by mixing component A, component B, and component C, and dispersing component A and component C in component B. In preparing the crosslinkable polymer composition, mixing is preferably carried out at room temperature, but may be carried out on heating as necessary.

(4) Content of Each Component

In the crosslinkable polymer composition of the disclosure, the content of each of the components A to C is specified in relation to the valence of each component. Specifically, the valence and content of each component satisfy the following formula (3).

$$g \geq 0.1 \text{ holds for } g=(m \cdot y - l \cdot x)/(n \cdot z) \quad (3)$$

In the formula, the metal ion released from component A is assumed to have the valence of $+y$ and the content of the metal ion is assumed as m mol. The substituent capable of ionic bonding in component B is assumed to have the valence of $-z$ and the content of that substituent is assumed as n mol. Furthermore, the acidic phosphate ester constituting component C is assumed to have the valence of $-x$ and the content thereof is assumed as 1 mol. When two or more elements with different valences are mixed for the metal ion, the substituent, or the acidic phosphate ester, the term of $m \cdot y$, $1 \cdot X$, or $n \cdot z$ in the formula (3) corresponds to the sum of the values calculated for the respective elements. For the acid phosphate ester, $1 \cdot X$ is calculated for each of the cases, i.e., the case of $x=2$ represented by the formula (C1) and the case of $x=1$ represented by the formula (C2), and the sum of the calculations corresponds to the 1-X value of the whole acid phosphate ester. The content of each element in terms of m mol, n mol, or l mol refers to the content of each element in the entire crosslinkable polymer composition.

In the crosslinkable polymer composition of the disclosure, the metal ion released from component A by heat are consumed by both the metal ion crosslinking of component B through formation of an ionic bond with the substituent of component B and formation of the phosphate ester salt with component C. Hence, for sufficient proceeding of the crosslinking of component B, the metal ion released from component A must still remain after being consumed to form the phosphate ester salt with component C. The value g in the formula (3) represents the amount of the metal ion, which are released from component A and remain unconsumed in formation of the phosphate ester salt with component C, in a form of a ratio to the amount of the substituent in component B, showing that the higher the value, the larger the amount of the metal ion that can contribute to crosslinking of component B.

If $g \leq 0$, it indicates that there are no remaining metal ion that can contribute to crosslinking of component B, and if $g \geq 0$, it indicates that there are remaining metal ion that can contribute to crosslinking of component B. If $g \geq 0.1$, it indicates that the amount of the metal ion remaining without being consumed in forming the phosphate ester salt with component C corresponds to 10% or more of the amount of the substituent of component B in equivalent number. If $g=1$, the metal ion remain in an equivalent number equal to that of the substituent in component B, but the crosslinkable polymer composition becomes highly viscous and may become a cured product through ionic crosslinking with only part of the substituent in component B; hence, the metal ion in the equivalent number equal to that of the substituent in component B is not required for sufficient progress of ionic crosslinking. If $g \geq 0.1$, crosslinking of component B can be sufficiently advanced to cure the crosslinkable polymer composition. From the viewpoint of enhancing curability, $g \geq 0.2$ is preferable, $g \geq 0.5$ is more preferable, and $g \geq 1.0$ is further preferable. On the other hand, $g \leq 2.0$ is preferable, and $g \leq 1.5$ is further preferable from the viewpoint of avoiding a situation caused by containing a large amount of component A, including separation or precipitation of component A in an uncured composition, and deterioration of physical properties, such as embrittlement, of a cured crosslinked product, and avoiding an adverse effect on anticorrosion performance of the cured crosslinked product due to such deterioration.

The crosslinkable polymer composition preferably contains component A in an amount of 1 part by mass or larger and 30 parts by mass or smaller with respect to 100 parts by mass of component B. The content of 1 part by mass or larger of component A provides sufficient crosslinking performance to component B and easily enables sufficient metal adsorptivity by the metal-adsorbing component formed by component C and the metal ion, and thus a high protective effect is exhibited on the metal surface. Controlling the content of component A to 30 parts by mass or smaller makes it easy to avoid separation or precipitation of component A before crosslinking of the crosslinkable polymer composition, and even after crosslinking thereof, hinders aggregation of component A, deterioration of physical properties of the crosslinked product, such as embrittlement, and deterioration of anticorrosion performance due to such phenomena. From these points of view, the lower limit of the content of component A is more preferably 2 parts by mass or larger, further preferably 5 parts by mass or larger, and still further preferably 10 parts by mass or larger. The upper limit of the content of component A is more preferably 20 parts by mass or smaller, and further preferably 15 parts by mass or smaller.

Furthermore, the crosslinkable polymer composition preferably contains component C in an amount of 1 part by mass or larger and 30 parts by mass or smaller with respect to 100 parts by mass of component B. The content of 1 part by mass or larger of component C leads to high metal adsorptivity of the metal-adsorbing component formed by the metal ion released from component A and component C, and thus a high protective effect is exhibited on the metal surface. Controlling the content of component C to 30 parts by mass or smaller makes it easy to avoid separation or precipitation of component C before crosslinking of the crosslinkable polymer composition, and even after crosslinking thereof, hinders aggregation of component C, deterioration of physical properties of the crosslinked product, such as embrittlement, and deterioration of anticorrosion performance due to such phenomena. From these points of view, the lower limit of the content of component C is more preferably 2 parts by mass or larger, and further preferably 5 parts by mass or larger. The upper limit of the content of component C is more preferably 20 parts by mass or smaller, further preferably 15 parts by mass or smaller, and still further preferably 10 parts by mass or smaller.

(5) Properties of Crosslinkable Polymer Composition

In the crosslinkable polymer composition of the disclosure having the above configuration, the metal ion is released from component A by heat, the released metal ion ionically bond with the substituent of component B, and the organic polymer of component B is crosslinked via the ionic bond. At the same time, the metal ion released from component A forms a phosphate ester metal salt with component C. Thus, the phosphate ester salt is dispersed in a crosslinked product of component B through heating.

Since the rate of ionic bond formation is faster than the rate of covalent bond formation, the crosslinkable polymer composition of the disclosure has high curing rate. In addition, component A releases the metal ion by heat, and thus, before the temperature at which the metal ion is released, the metal ion is not released from component A, and crosslinking of the organic polymer of component B through ionic bonding does not proceed. Hence, the crosslinkable polymer composition of the disclosure also has excellent storage stability, and can effectively form a highly uniform coating film by applying the crosslinkable polymer composition to an object, such as a metal surface, in a highly fluid state before crosslinking and then heating. Furthermore, for the crosslinkable polymer composition of the disclosure, the organic polymer of component B is crosslinked via an ionic bond, so that binding force is stronger than van der Waals force, and a strong crosslinked product is formed. In addition, the crosslinkable polymer composition of the disclosure has excellent heat resistance and excellent chemical resistance because the organic polymer of component B is crosslinked via an ionic bond.

The phosphate ester salt formed by the metal ion released from component A and component C is highly uniformly dispersed in the crosslinked product of component B, and thus exhibits metal adsorptivity. Such metal adsorptivity causes a high anticorrosion property to be exhibited for a metal surface. Although component C exhibits a certain degree of metal adsorptivity even if it remains as the acidic phosphate ester without ionic bonding with the metal ion to form the phosphate ester salt, component C exhibits higher anticorrosion performance when it forms the phosphate ester salt with the metal ion, as it is more easily adsorbed to the metal surface via the ionic bond.

In the crosslinkable polymer composition of the disclosure, the component ratio between the components A, B, and C is specified such that g≥0.1 is satisfied, thereby the metal ion released from component A by heat can contribute to both metal ion crosslinking of component B and formation of the phosphate ester salt with component C. As a result, there are achieved both improvement in heat resistance due to crosslinking of component B and improvement in anticorrosion property due to formation of the phosphate ester salt.

The crosslinkable polymer composition of the disclosure is effectively crosslinked and cured by heat. The crosslinked polymer material of the disclosure contains the crosslinked product of the crosslinkable polymer composition of the disclosure. In the crosslinked product, component B in the crosslinkable polymer composition is crosslinked via the metal ion released from component A.

The crosslinkable polymer composition of the disclosure can be preferably used as a protective material having an anticorrosion property, an adhesive material, a curing molding material, and the like. For example, the crosslinkable polymer composition can be used for anticorrosion, i.e., can be adhered to a surface of a metal base being a surface protection object to cover the metal base for preventing metal corrosion. Furthermore, for anticorrosion use, the crosslinkable polymer composition can be used as an anticorrosion agent for a covered wire with a terminal, for example.

[2] Metal Member

The metal member of the disclosure is now described. FIG. 1 shows a cross section of a metal member according to one embodiment.

A metal member 10 includes a metal base 12 and a coating material 14 covering a surface of the metal base 12, and the coating material 14 contains the crosslinked polymer material of the disclosure, i.e., the crosslinked product (cured product) of the crosslinkable polymer composition of the disclosure. Since the coating material 14 contains the crosslinked polymer material of the disclosure, the metal member 10 of the disclosure has an excellent anticorrosion effect.

[3] Wiring Harness

A wiring harness according to the disclosure is now described. The wiring harness of the disclosure includes the crosslinked polymer material of the disclosure. Specifically, for example, there is a mode, in which the crosslinked polymer material of the disclosure is used in an anticorrosive agent covering an electrical connection of a terminal fitting of a covered wire with a terminal and a wire conductor in the wiring harness.

A covered wire with a terminal, which configures the wiring harness of the disclosure, is now described. The covered wire with a terminal is a wire, in which a terminal fitting is connected to a conductor terminal of an insulated wire, and the electrical connection between the terminal fitting and the wire conductor is covered with the crosslinked polymer material (a cured product of the crosslinkable polymer composition of the disclosure) of the disclosure. This structure prevents corrosion at the electrical connection.

Figure 2:
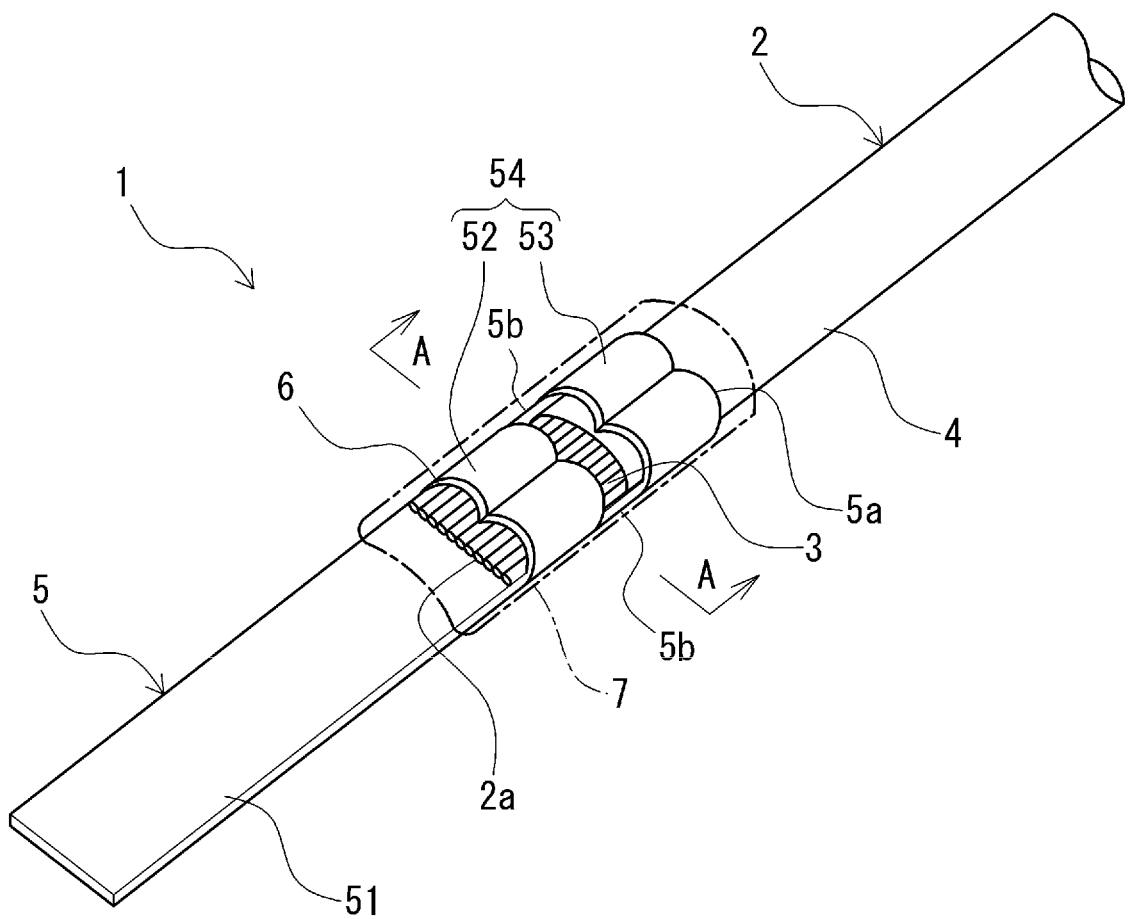
FIG. 2 is a perspective view of a wiring harness according to one embodiment of the disclosure.
Figure 3:
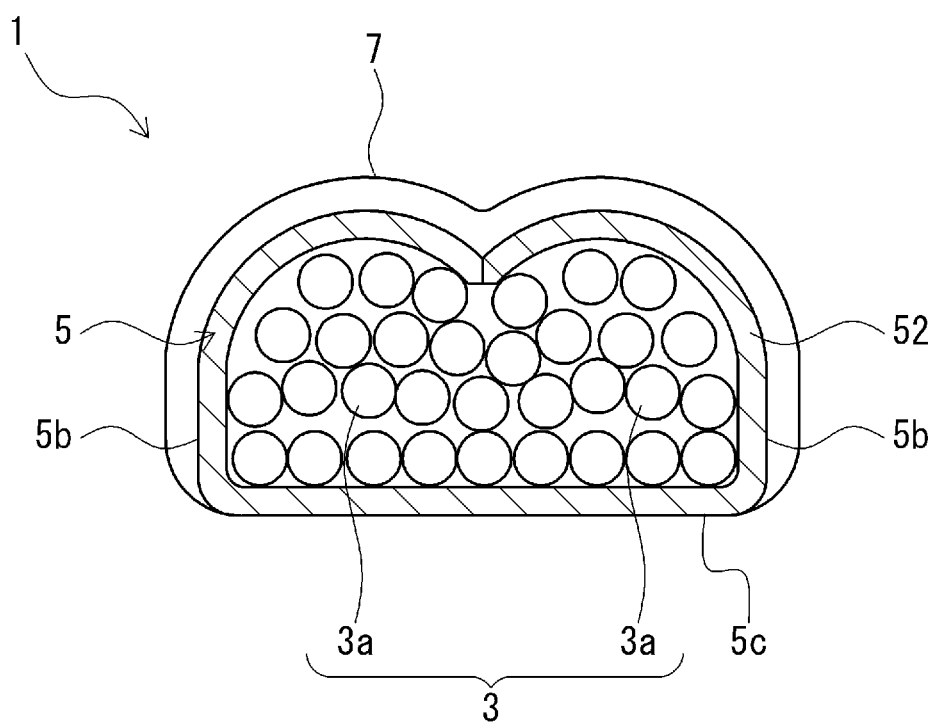
FIG. 3 is a vertical cross section taken along the line A-A in FIG. 2.

FIG. 2 is a perspective view of the covered wire with a terminal according to one embodiment of the disclosure. FIG. 3 is a vertical cross section along a line A-A in FIG. 2. As illustrated in FIGS. 2 and 3, a covered wire 1 with a terminal is configured such that a wire conductor 3 of a covered wire 2, in which the wire conductor 3 is covered with an insulation coating (insulator) 4, and a terminal fitting 5 are electrically connected by an electrical connection 6.

The terminal fitting 5 includes a tab-shaped connection portion 51 formed of an elongated flat plate to be connected to a mating terminal, and a wire fixture 54 formed of a wire barrel 52 and an insulation barrel 53 formed in an extending manner on an end portion of the connection portion 51. The terminal fitting 5 can be formed (machined) into a predetermined shape by pressing a metal plate.

At the electrical connection 6, the insulation coating 4 of the terminal of the covered wire 2 is peeled off to expose the wire conductor 3, and the exposed wire conductor 3 is crimped onto one side of the terminal fitting 5 to connect the covered wire 2 to the terminal fitting 5. The wire barrel 52 of the terminal fitting 5 is swaged over the wire conductor 3 of the covered wire 2 to electrically connect the wire conductor 3 and the terminal fitting 5. Furthermore, the insulation barrel 53 of the terminal fitting 5 is swaged over the insulation coating 4 of the covered wire 2.

In the covered wire 1 with the terminal, the area indicated by the single dotted line is covered with a cured product 7 of the crosslinkable polymer composition of the disclosure. Specifically, the cured product 7 covers the area from the surface of the terminal fitting 5 ahead of the tip end of a portion of the wire conductor 3 exposed from the insulation coating 4 to the surface of the insulation coating 4 behind the rear end of the portion of the wire conductor 3 exposed from the insulation coating 4. That is, the tip end 2a side of the covered wire 2 is covered with the cured product 7 so as to slightly protrude from the tip end of the wire conductor 3 toward the connection portion 51 of the terminal fitting 5. The edge 5a side of the terminal fitting 5 is covered with the cured product 7 so as to protrude slightly from the end of an insulation barrel 53 toward the insulation coating 4 of the covered wire 2. As shown in FIG. 3, the side surface 5b of the terminal fitting 5 is also covered with the cured product 7. The back surface 5c of the terminal fitting 5 may or may not be covered with the cured product 7. The peripheral edge of the cured product 7 is configured of a portion in contact with the surface of the terminal fitting 5, a portion in contact with the surface of the wire conductor 3, and a portion in contact with the surface of the insulation coating 4.

In this way, the electrical connection 6 is covered with the cured product 7 with a predetermined thickness along the shape of the outer peripheries of the terminal fitting 5 and the covered wire 2. The exposed portion of the wire conductor 3 of the covered wire 2 is thus completely covered with the cured product 7 so as not to be exposed to the outside. The electrical connection 6 is therefore completely covered with the cured product 7. Since the cured product 7 has excellent adhesion to the wire conductor 3, the insulation coating 4, and the terminal fitting 5, the cured product 7 prevents metal portions from corroding due to moisture or the like entering the wire conductor 3 and electrical connection 6 from the outside. Since the cured product 7 has excellent adhesion, even if the electric wire is bent, for example, in a process from manufacturing of a wiring harness to attaching thereof to a vehicle, a gap is less likely to be formed between the cured product 7 and any of the components, i.e., the wire conductor 3, the insulation coating 4, and the terminal fitting 5 at the circumferential end of the cured product 7, and thus waterproof and anticorrosion functions are maintained.

The crosslinkable polymer composition of the disclosure forming the cured product 7 is applied to a predetermined area. The crosslinkable polymer composition of the disclosure forming the cured product 7 can be applied using any of known methods such as a dropping method and a coating method.

The cured product 7 is formed in a predetermined thickness over the predetermined area. The thickness is preferably 0.1 mm or smaller. Extremely large thickness of the cured product 7 makes it difficult to insert the terminal fitting 5 into a connector.

The wire conductor 3 of the covered wire 2 is configured of a twisted wire formed by twisting a plurality of strands 3a. In this case, the twisted wire may be configured of one type of metal strand or two or more types of metal strands. The twisted wire may include a strand made of an organic fiber in addition to the metal strand. In addition, "configured of one type of metal strand" means that all the metal strands configuring the twisted wire are made of the same metal material, and "configured of two or more types of metal strands" means that the twisted wire includes metal strands made of different metal materials. The twisted wire may include a reinforcing wire (tension member) or the like for reinforcing the covered wire 2.

Examples of material of the metal strand configuring the wire conductor 3 can include copper, copper alloy, aluminum, aluminum alloy, and materials with any of distinct types of plating on such materials. Examples of material of the metal strand as the reinforcing wire can include copper alloy, titanium, tungsten, and stainless steel. Examples of the organic fiber as the reinforcing wire can include Kevlar. Aluminum, aluminum alloy, or materials with distinct types of plating on such materials are preferred for the metal strand configuring the wire conductor 3 from the viewpoint of weight reduction.

Examples of materials for the insulation coating 4 include rubber, polyolefin, PVC, and thermoplastic elastomers. These materials may be used alone or in combination of two or more. Various additives may be appropriately added to the material of the insulation coating 4. Examples of the additives can include flame retardants, fillers, and colorants.

Examples of the material of the terminal fitting 5 (material of a base material) can include generally used brass, various copper alloys, and copper. A part (for example, a contact) of or the whole of the surface of the terminal fitting 5 may be plated with any of various metals such as tin, nickel, and gold.

Although the terminal fitting is connected by crimping to the terminal of the wire conductor in the covered wire 1 with the terminal shown in FIG. 2, other known electrical connection methods such as welding may be used instead of the crimp connection.

EXAMPLE

An example is now described. The present invention is not limited by the example. Herein, relationships between a component composition of the crosslinkable polymer composition and curing rate, between the component composition and heat resistance, and between the component composition and anticorrosion performance were investigated.

Preparation of Crosslinkable Polymer Composition

Crosslinkable polymer compositions for samples A1 to A10 and B1 to B8 were prepared by mixing the components A to C in an agate mortar for 5 min at room temperature with blending compositions (in parts by mass) listed in Table 1. The components A and C were not added in sample B1, and the component C was not added in sample B2.

The materials used were as follows.

(1) Component A
  Ca-AA: Calcium (II) acetylacetonate.
  Zn-AA: Zinc (II) acetylacetonate.
  Al-IP: Aluminum (III) triisopropoxide.
  ZnO: Zinc oxide (II).
  Ca-St: Calcium stearate (II).
(2) Component B
  MA5: Maleic anhydride-modified liquid polybutadiene (manufactured by CRAY VALLEY), substituent equivalent 2350 g/mol.
  UC3510: Carboxyl group-introduced liquid polyacrylate (manufactured by Toagosei Co., Ltd.), substituent equivalent weight 801 g/mol.
  X-22-3701E: Carboxyl-modified silicone oil (manufactured by Shin-Etsu Chemical Co., Ltd.), substituent equivalent 4000 g/mol.
  R134: Liquid polybutadiene (manufactured by CRAY VALLEY), no substituent capable of ionic bonding.
(3) Component C
  EH-P: Di-2-ethylhexyl acid phosphate ("Phoslex A-208" manufactured by SC Organic Chemical Co., Ltd., molecular weight 322 (average), acid value 172 mgKOH/g).
  ST-P: N-stearyl acid phosphate ("phoslex A18" manufactured by SC Organic Chemical Co., Ltd., molecular weight 437 (average), acid value 228 mgKOH/g.
  OL-P: Oleyl acid phosphate ("Phoslex A18D" manufactured by SC Organic Chemical Co., Ltd., molecular weight 467 (average), acid value 183 mgKOH/g).
  MT-P: Methyl acid phosphate ("Phoslex A-1" manufactured by SC Organic Chemical Co., Ltd., molecular weight 119 (average), acid value 707 mgKOH/g).

Evaluation Method (1) Curing Time

A copper plate 50 mm long, 50 mm wide, and 0.5 mm thick was preheated to 120° C., and 0.1 g of each prepared composition was dripped on the plate. The time point at which each composition was dripped onto the heated copper plate was defined as 0 s (0 sec), and the time until the dripped composition was cured was defined as curing time. Time taken for the composition to cure was defined as the time until the composition ceased to string when a spatula was applied to the surface of the dripped composition and pulled up. A composition found to cure within 60 sec can be evaluated to be excellent in curing rate (fast curing).

(2) Heat Resistance

In the test of curing time evaluation, for the cured sample, the copper plate was left standing vertically in an oven at 155° C. for 2 hr, and then a state of the cured product was visually observed. A cured product that did not drip down was evaluated to be extremely good in heat resistance, "A", a cured product that partially dripped down was evaluated to be good in heat resistance, "B", and a cured product that completely dripped down was evaluated to be bad in heat resistance, "C". Measurement conditions including a temperature condition were in accordance with JIS C60068-2-2.

(3) Anticorrosion Performance

Each of the compositions was applied to a portion extending 2 cm from one end of a strip of 1 cm×5 cm copper plate, and cured for 5 min in an oven at 120° C. The copper plate was then left vertically in an oven at 155° C. for 2 hr with the coated one end side up, and then returned to room temperature. The resultant sample was used as a measurement specimen. The coated and cured portion (coating film portion) of the measurement specimen was used as a cathode electrode, and a separately prepared Al plate was used as an anode electrode, and the electrodes were immersed in a 5%.

NaCl aqueous solution to measure a potential difference (corrosion current). It can be said that the smaller the potential difference, the more uniform the cured composition exists as a coating film on the strip copper plate, and the stronger the adsorption force to the surface of the strip copper plate. On the other hand, it can be said that the larger the potential difference, the more uneven the curing of the composition on the strip copper plate, or the weaker the adsorption force of the composition to the surface of the strip copper plate. When an untreated strip copper plate, which had not been immersed in the surface protective agent composition, was left vertically in an oven at 155° C. and then used as the cathode electrode, the corrosion current value was 80 μA. With this value of 80 μA as a reference value, if the current value measured for each sample is less than 1/10 of the reference value, the anticorrosion performance (surface protection property) is determined to be particularly high "A", and if the current value is 1/10 or more and less than 1/5 of the reference value, the anticorrosion performance is determined to be high "B". If the current value is more than 1/5 of the reference value, the anticorrosion performance is determined to be less effective "C".

Evaluation Results

Table 1 below shows the content (in parts by mass) of each component for the samples A1 to A10 and B1 to B8 in the upper row and the results of each evaluation in the lower row. The left column in the table shows the equivalent number per mass for each component. The unit is mEq/g, where the valence (Eq) of each component per gram is represented in milli-units. That is, the equivalent number (mEq/g) is calculated as a valence of each component/molecular weight×1000. For component C, the valence is shown as a calculated value of the weighted average of the valence (divalent) of the compound expressed by the formula (C1) and the valence (univalent) of the compound expressed by the formula (C2), depending on the content. In the middle of the table, each of the values of $m \cdot y$, $n \cdot z$ and $1 \cdot x$ is calculated as the product of the content of each component and the equivalent number thereof, and the g values are calculated from such values and listed.

TABLE 1

| | | Valence | Equivalent Number (mEq/g) | A1 | A2 | A3 | A4 | A5 | A6 | A7 | A8 | A9 | A10 |
|---|---|---|---|---|---|---|---|---|---|---|---|---|---|
| Component A | Ca-AA | 2 | 8.4 | 12.0 | | | 12.0 | 12.0 | 12.0 | 12.0 | 30.0 | 20.0 | 2.0 |
| | Zn-AA | 2 | 7.6 | | 12.0 | | | | | | | | |
| | Al-IP | 3 | 14.7 | | | 12.0 | | | | | | | |
| | ZnO | 2 | 24.6 | | | | | | | | | | |
| | Ca-St | 2 | 6.2 | | | | | | | | | | |
| Component B | MA5 | 2 | 0.9 | 80.0 | 80.0 | 80.0 | | | 80.0 | 80.0 | 60.0 | 50.0 | 97.0 |
| | UC3510 | 1 | 1.2 | | | | 80.0 | | | | | | |
| | X-22-3701E | 1 | 0.3 | | | | | 80.0 | | | | | |
| | R134 | — | 0.0 | | | | | | | | | | |
| Component C | EH-P | 1 | 3.1 | 8.0 | 8.0 | 8.0 | 8.0 | 8.0 | | | 10.0 | 30.0 | 1.0 |
| | ST-P | 1.6 | 4.1 | | | | | | 8.0 | | | | |
| | OL-P | 1.4 | 3.3 | | | | | | | 8.0 | | | |
| | MT-P | 1.5 | 12.6 | | | | | | | | | | |
| | m · y | | | 101 | 91.2 | 176.4 | 101 | 101 | 101 | 101 | 252 | 168 | 16.8 |
| | n · z | | | 72.0 | 72.0 | 72.0 | 96.0 | 24.0 | 72.0 | 72.0 | 54.0 | 45.0 | 87.3 |
| | 1 · x | | | 24.8 | 24.8 | 24.8 | 24.8 | 24.8 | 32.8 | 26.4 | 31.0 | 93.0 | 3.1 |
| | g value: (m · y − 1 · x)/(n · z) | | | 1.06 | 0.92 | 2.11 | 0.79 | 3.17 | 0.94 | 1.03 | 4.09 | 1.67 | 0.16 |
| | Curing time (s) (@120° C.) | | | 40 | 35 | 35 | 40 | 35 | 35 | 40 | 30 | 45 | 55 |
| | Heat resistance | | | A | A | A | A | A | A | A | A | A | B |
| | Anticorrosion performance | | | A | A | A | A | A | A | A | B | B | B |

| | | Valence | Equivalent Number (mEq/g) | B1 | B2 | B3 | B4 | B5 | B6 | B7 | B8 |
|---|---|---|---|---|---|---|---|---|---|---|---|
| Component A | Ca-AA | 2 | 8.4 | | 12.0 | | | 12.0 | 14.0 | 5.0 | 5.5 |
| | Zn-AA | 2 | 7.6 | | | | | | | | |
| | Al-IP | 3 | 14.7 | | | | | | | | |
| | ZnO | 2 | 24.6 | | | | 8.0 | | | | |
| | Ca-St | 2 | 6.2 | | | | | 12.0 | | | |
| Component B | MA5 | 2 | 0.9 | 100.0 | 88.0 | 80.0 | 80.0 | | 80.0 | 70.0 | 80.0 |
| | UC3510 | 1 | 1.2 | | | | | | | | |
| | X-22-3701E | 1 | 0.3 | | | | | | | | |
| | R134 | — | 0.0 | | | | | 80.0 | | | |
| Component C | EH-P | 1 | 3.1 | | | 12.0 | 8.0 | 8.0 | | 25.0 | 14.5 |
| | ST-P | 1.6 | 4.1 | | | | | | | | |
| | OL-P | 1.4 | 3.3 | | | | | | | | |
| | MT-P | 1.5 | 12.6 | | | | | | 6.0 | | |
| | m · y | | | 0.0 | 101 | 197 | 74.4 | 101 | 118 | 42.0 | 46.2 |
| | n · z | | | 90.0 | 79.2 | 72.0 | 72.0 | 0.0 | 72.0 | 63.0 | 72.0 |
| | 1 · x | | | 0.0 | 0.0 | 37.2 | 24.8 | 24.8 | 75.6 | 77.5 | 45.0 |
| | g value: (m · y − 1 · x)/(n · z) | | | 0.00 | 1.27 | 2.22 | 0.69 | — | 0.58 | −0.56 | 0.02 |
| | Curing time (s) (@120° C.) | | | >600 | 40 | >600 | 500 | >600 | 45 | >600 | 280 |
| | Heat resistance | | | C | A | C | C | C | B | C | C |
| | Anticorrosion performance | | | C | C | C | C | C | C | C | C |

The compositions of the samples A1 to A10 each contain, as component A, a compound in which metal ion is released by heat, as component B, an organic polymer having a substituent capable of ionic bonding with the metal ion, and as component C, the acidic phosphate ester containing one or more species represented by the above general formulas (C1) and (C2), where the g value defined by valences and the contents of the components satisfies g≥0.1. Correspondingly, in any of the samples A1 to A10, curing proceeds in a short curing time of 60 sec or less, and good heat resistance and good anticorrosion performance, which are each evaluated as A or B, are obtained. It is interpreted that some of the metal ion released from component A crosslink component B to form a highly heat-resistant cured product in a short time, and another some of the metal ion form the phosphate ester salt with component C, so that a high anticorrosion performance is provided to the film of the cured product.

In the samples A8 to A10, although sufficiently high anticorrosion performance to be rated as B is shown, the anticorrosion performance is not as high as that in the samples A1 to A7. In the sample A10, heat resistance is also not as high as that in the samples A1 to A9, and curing time is slightly longer. In the sample A8, compared to the samples A1 to A7, the content of component A is high, and the g value is correspondingly slightly high, which is interpreted as deterioration of physical properties of the crosslinked product due to the large amount of component A contained. In the sample A9, compared to the samples A1 to A7, the content of component B is low, and the content of component C is high, and thus it is interpreted that component C is relatively less likely to take the form of phosphate ester combined with metal ion. In the sample A10, the respective contents of component A and component C are lower than those of each of the samples A1 to A9, and the g value is relatively small. It is interpreted that crosslinking of component B by the metal ion and salt formation of component C correspondingly proceed less efficiently than in the samples A1 to A9.

In the sample B1, since the composition does not contain component A, even if the composition is heated, crosslinking of component B by the metal ion does not occur. Hence, the maleic anhydride-modified liquid polybutadiene of component B remained as it was and was not cured even after the lapse of heating time of 600 sec. In the sample B2, since crosslinking of component B proceeds due to contribution of component A, curing proceeds in a short time, and a coating film with high heat resistance is formed, but the anticorrosion performance is lower corresponding to no component C, which is to be the metal-adsorbing component, contained.

In the sample B3, zinc oxide that does not release metal ion even if heated is used as component A instead of a component that releases metal ion by heat. Hence, component B was not able to be crosslinked via metal ion, and the composition did not cure even after the lapse of heating time of 600 sec. Anticorrosion performance is also low due to that the curing does not progress. In the sample B4, calcium stearate, which is a fatty acid metal salt, is used as component A instead of the component that releases metal ion by heat. Heating a fatty acid metal salt only results in formation of a metal oxide by thermal decomposition, and thus even if the composition is heated, no metal ion is released. As a result, component B cannot be crosslinked via metal ion, and it takes 500 sec to cure the composition. Such low curability of the composition and insufficient progress of curing also result in low anticorrosion performance.

In the sample B5, since liquid polybutadiene with no ion-bondable substituent was used as component B, the composition did not cure even after the lapse of heating time of 600 sec while containing component A. Anticorrosion performance is also low due to that the curing does not progress.

In the sample B6, an acidic phosphate ester with a methyl group, which is a hydrocarbon group with one carbon atom, is used as component C instead of the acidic phosphate ester with a hydrocarbon group with 4 to 30 carbon atoms. In this case, curing proceeds by heating in a short time and good heat resistance is obtained, but anticorrosion performance is low. It is considered that since the methyl group contained in the acidic phosphate ester has a small carbon number, compatibility of component C with component B is poor, and component C separates or agglomerates in the composition, resulting in low adsorption to the metal surface.

In each of the samples B7 and B8, a large amount of component C is contained as compared to component A, and a g value of g<0.1 is shown. Crosslinking of component B via the metal ion is correspondingly not allowed to proceed sufficiently, and the composition does not cure in a short time. Anticorrosion performance is also low due to such insufficient progress of curing. In the sample B7, g<0 is shown, and corresponding to the extremely small g value, no curing is observed even after the lapse of heating time of 600 sec. In the sample B8, 0<g<0.1 is shown, and although a long time of 280 sec is taken for curing, curing of the composition is found in correspondence to the g value that is not as small as in the sample B7. However, crosslinking of the sample is still considered insufficient, and anticorrosion performance is still low in the sample B8.

Although some embodiments of the disclosure have been described in detail hereinbefore, the present invention is not limited thereto, and various modifications can be made without departing from the gist of the invention.

LIST OF REFERENCE SIGNS

1 Covered wire with terminal
2 Covered wire
2a Covered wire tip end
3 Wire conductor
3a Strand
4 Insulation coating (insulator)
5 Terminal fitting
5a Terminal fitting edge
5b Terminal fitting side surface
5c Terminal fitting back surface
51 Connection
52 Wire barrel
53 Insulation barrel
54 Wire fixture
6 Electrical connection
7 Cured product
10 Metal member
12 Metal base
14 Coating material

The invention claimed is:

1. A crosslinkable polymer composition comprising an ingredient A selected from the group consisting of calcium acetylacetonate, calcium isopropixide, zinc acetylacetonate, zinc isopropixide, titanium acetylacetonate, titanium isopropixide, aluminum acetylacetonate, and aluminum triisopropoxide, an ingredient B selected from the group consisting of maleic anhydride-modified liquid polybutadienes, carboxyl group-introduced liquid polyacrylates, and carboxyl-modified silicone oils, and an ingredient C selected from the group consisting of one or more acidic phosphate esters represented by the general formulas (C1) and (C2) below, $$P(=O)(-OR)(-OH)_2 \tag{C1}$$

$$P(=O)(-OR)_2(-OH) \tag{C2}$$

wherein, assuming that the metal ion released from component A has a valence of +y and a content of the metal ion is m mol, the substituent contained in component B has a valence of −z and a content of the substituent is n mol, the acidic phosphate constituting component C has a valence of −x and a content of the acidic phosphate esters is 1 mol, $g \geq 0.1$ holds for $g=(m \cdot y - l \cdot x)/(n \cdot z)$, where R is a hydrocarbon group with a carbon number of 4 to 30.

2. The crosslinkable polymer composition according to claim 1, wherein the substituent of component B is an electron-withdrawing group.

3. The crosslinkable polymer composition according to claim 1, wherein the substituent of component B is at least one selected from the group consisting of a carboxylic acid group, an acid anhydride group, a phosphoric acid group, and a sulfonic acid group.

4. The crosslinkable polymer composition according to claim 1, wherein component B is liquid at 150° C. or lower.

5. The crosslinkable polymer composition according to claim 1, wherein component A is contained in the composition in an amount of 1 part by mass or larger and 30 parts by mass or smaller with respect to 100 parts by mass of component B.

6. The crosslinkable polymer composition according to claim 1, wherein component C is contained in the composition in an amount of 1 part by mass or larger and 30 parts by mass or smaller with respect to 100 parts by mass of component B.

7. A crosslinked polymer material being a crosslinked product of the crosslinkable polymer composition according to claim 1,
wherein component B is crosslinked via the metal ion released from component A.

8. A metal member, comprising:
a metal base; and
a coating material covering a surface of the metal base,
wherein the coating material is comprises the crosslinked polymer material according to claim 7.

9. A wiring harness, comprising the crosslinked polymer material according to claim 7.

* * * * *